United States Patent Office 3,031,378
Patented Apr. 24, 1962

3,031,378
METHOD OF INACTIVATING VIRUSES
Morizo Ishidate, 608 Koenji 4-chome, Suginamiku, Tokyo, Japan; Masakatsu Goto, 8–3 Yonbancho, Chiyodaku, Tokyo, Japan; and Kazuo Ogasawara, 1 Eikincho 1-chome, Showaku, Nagoya, Japan
No Drawing. Filed May 27, 1960, Ser. No. 32,122
Claims priority, application Japan May 30, 1959
2 Claims. (Cl. 167—78)

In general, formalin, phenol, merthiolate, etc. have been used as chemical substances for inactivated vaccines of bacteria and viruses. However, these substances have been more or less toxic thereby exhibit toxicity to the host, so these chemicals are not desirable.

The present invention is based on a novel knowledge that, when certain concentration of glucuronolactone, glucuronic acid or its salt will be mixed with viruses in vitro, the viruses will be inactivated and also the antigenic properties of the viruses will not be so much reduced as by other known inactivating substances. The glucuronolactone, glucuronic acid or its salt, especially, sodium salt has hitherto been appreciated as a part of normal component present in the tissue of animals, so it does not exhibit any complication when administered to excess. Accordingly, the product obtained by the present invention can be advantageously used as improved vaccines.

The present invention shall now be explained in more details. A virus suspension is treated at the room temperature (20° C.) or a lower temperature with the addition of glucuronolactone, glucuronic acid or its salt to inactivate virus and then pH thereof is adjusted at 6–8. In this case, one must take care that the virus may not be inactivated by other factors as heat and the like.

The results of experiments in which mice inoculated with the virus suspensions treated by the application of the methods for the mouse hepatitis virus, Japanese B encephalitis virus, rabies virus and influenza virus are tabulated in the following.

EXAMPLE 1

$10^{-6}$ dilution of mouse hepatitis virus (Busher strain, i.p., $LD_{50}=10^{-7.6}/0.2$ ml.) was prepared with a Bacto-Brain Heart Infusion Broth of Difco Laboratories. Three $10^{-7}$ dilutions are prepared with 25%, 12.5% and 6.25% sodium glucuronate adjusted pH 7.04 with phosphate buffer solution, and were maintained at the room temperature for one hour and then in an ice chest for 12 and 48 hours. 0.2 ml. of the solution was intraperitoneally inoculated in each mouse (♂ dd strain 10 to 12 g.). Same procedure was performed with $10^{-6}$ and $10^{-5}$ dilutions of the mouse hepatitis virus. For controls, $10^{-5}$, $10^{-6}$ and $10^{-7}$ virus suspensions were prepared with only phosphate buffer solution.

The results for 10 days after inoculation of mixture virus and sodium glucuronate are given in Table 1.

Table 1
EXPERIMENTS ON INACTIVATION OF THE MOUSE HEPATITIS VIRUS WITH SODIUM GLUCURONATE

| Time of leaving in the ice chest (4° C.) | Concentration of the sodium glucuronate solution used in dilution, percent | Concentration of the mouse hepatitis virus dilution | | | | | |
|---|---|---|---|---|---|---|---|
| | | $10^{-5}$ | | $10^{-6}$ | | $10^{-7}$ | |
| | | Mortality | | Mortality | | Mortality | |
| | | Ratio | Percent | Ratio | Percent | Ratio | Percent |
| 12 hours | 6.25 | 17/20 | 85 | 4/20 | 20 | 1/10 | 10 |
| | 12.5 | 12/20 | 60 | 2/20 | 10 | 0/10 | 0 |
| | 25 | 10/20 | 50 | 0/20 | 0 | 0/10 | 0 |
| | Control | 20/20 | 100 | 17/20 | 85 | 5/10 | 50 |
| 48 hours | 6.25 | 2/20 | 10 | 1/20 | 5 | 0/10 | 0 |
| | 12.5 | 0/20 | 0 | 0/20 | 0 | 0/10 | 0 |
| | 25 | 0/20 | 0 | 0/20 | 0 | 0/10 | 0 |
| | Controls | 19/20 | 95 | 12/20 | 60 | 4/10 | 40 |

EXAMPLE 2

$10^{-6}$ dilution of the Japanese B encephalitis virus (Nakayama strain, i.c., $LD_{50}=10^{-7}/0.03$ ml.) was prepared from infected mouse brain, was mixed with pH 7.4 sodium glucuronate as the same method as previously described, and maintained for 1 hour at 22° C., following in an ice chest for 48 hours. After this procedure the virus suspensions were inoculated into mice intracerebrally.

The results for 2 weeks after inoculation are given in Table 2:

Table 2
EXPERIMENTS ON INACTIVATION OF THE JAPANESE B ENCEPHALITIS VIRUS BY SODIUM GLUCURONATE

| Concentration of the sodium glucuronate solution used in dilution, percent | Mortality | |
|---|---|---|
| | Ratio | Percent |
| 6.25 | 1/10 | 10 |
| 12.5 | 1/10 | 10 |
| 25 | 0/10 | 0 |
| Control | 9/10 | 90 |

EXAMPLE 3

The mixture of influenza virus ($P_R$ 8 strain, $EID_{50}=10^{-7.6}/0.2$ ml. for 11 old embryonated chicken eggs) and sodium glucuronate which harvested from allantoic fluid was kept one hour at 22° C. and in an ice chest for 48 hours. These suspensions were instillated into mice intranasally.

The results of the observation for 80 hours are given in Table 3:

Table 3
EXPERIMENTS ON INACTIVATION OF THE INFLUENZA VIRUS WITH SODIUM GLUCURONATE

| Concentration of the sodium glucuronate solution used in dilution, percent | Morbidity | |
|---|---|---|
| | Ratio | Percent |
| 6.25 | 0/8 | 0 |
| 12.5 | 0/8 | 0 |
| 25 | 0/7 | 0 |
| Control | 3/7 | 43 |

EXAMPLE 4

$10^{-4}$, $10^{-5}$ and $10^{-6}$ dilutions of the rabies virus (CVS strain, i.c., $LD_{50}=10^{-7.4}/0.2$ ml.) were prepared in the same manner as in Example 1, were kept 1 hour at 22° C. and in an ice chest for 48 hours and were inoculated respectively into mice intracerebrally (♂ dd strain 10 to 12 g.).

The results are given in Table 4:

Table 4
EXPERIMENTS ON INACTIVATION OF RABIES VIRUS WITH SODIUM GLUCURONATE

| Concentration of the sodium glucuronate solution used in dilution, percent | Concentration of the rabies virus dilution | | | | | |
|---|---|---|---|---|---|---|
| | $10^{-4}$ | | $10^{-5}$ | | $10^{-6}$ | |
| | Mortality | | Mortality | | Mortality | |
| | Ratio | Percent | Ratio | Percent | Ratio | Percent |
| 6.25 | 8/10 | 80 | 0/10 | 0 | 0/10 | 0 |
| 12.5 | 0/10 | 0 | 0/10 | 0 | 0/10 | 0 |
| 25 | 0/10 | 0 | 0/10 | 0 | 0/10 | 0 |
| Control | 10/10 | 100 | 10/10 | 100 | 7/10 | 70 |

From these experiments it is obvious that sodium glucuronate inactivates viruses in vitro. Likewise, glucuronic acid, glucuronolactone or any other salt of glucuronic acid may be used for inactivation of viruses.

bodies in each group were tested by intracerebral inoculation by the conventional method.

| Antigens | Virus dilution | Days in observation | | | | | | | | | | | | | | Mortality ratio | LD$_{50}$ |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | Number of deaths by infection | |
| I | $10^{-2}$ | 0 | 0 | 0 | 0 | 0 | 0 | 3 | 2 | 0 | 0 | 0 | 0 | 0 | 0 | 5/5 | 2.9 |
| | $10^{-3}$ | 0 | 0 | 0 | 0 | 0 | 0 | 0 | 1 | 1 | 0 | 0 | 0 | 0 | 0 | 2/5 | |
| | $10^{-4}$ | 0 | 0 | 0 | 0 | 0 | 0 | 0 | 0 | 0 | 0 | 0 | 0 | 0 | 0 | 0/5 | |
| | $10^{-5}$ | 0 | 0 | 0 | 0 | 0 | 0 | 0 | 0 | 0 | 0 | 0 | 0 | 0 | 0 | 0/5 | |
| | $10^{-6}$ | 0 | 0 | 0 | 0 | 0 | 0 | 0 | 0 | 0 | 0 | 0 | 0 | 0 | 0 | 0/5 | |
| II | $10^{-2}$ | 0 | 0 | 0 | 0 | 0 | 0 | 2 | 1 | 1 | 0 | 0 | 0 | 0 | 0 | 4/5 | <2.5 |
| | $10^{-3}$ | 0 | 0 | 0 | 0 | 0 | 0 | 1 | 0 | 0 | 0 | 0 | 0 | 0 | 0 | 1/5 | |
| | $10^{-4}$ | 0 | 0 | 0 | 0 | 0 | 0 | 0 | 0 | 0 | 0 | 0 | 0 | 0 | 0 | 0/5 | |
| | $10^{-5}$ | 0 | 0 | 0 | 0 | 0 | 0 | 0 | 0 | 0 | 0 | 0 | 0 | 0 | 0 | 0/5 | |
| | $10^{-6}$ | 0 | 0 | 0 | 0 | 0 | 0 | 0 | 0 | 0 | 0 | 0 | 0 | 0 | 0 | 0/5 | |
| III | $10^{-2}$ | 0 | 0 | 0 | 0 | 0 | 0 | 0 | 1 | 0 | 0 | 0 | 0 | 0 | 0 | 1/5 | <1.9 |
| | $10^{-3}$ | 0 | 0 | 0 | 0 | 0 | 0 | 0 | 1 | 0 | 0 | 0 | 0 | 0 | 0 | 1/5 | |
| | $10^{-4}$ | 0 | 0 | 0 | 0 | 0 | 0 | 0 | 0 | 0 | 0 | 0 | 0 | 0 | 0 | 0/5 | |
| | $10^{-5}$ | 0 | 0 | 0 | 0 | 0 | 0 | 0 | 0 | 0 | 0 | 0 | 0 | 0 | 0 | 0/5 | |
| | $10^{-6}$ | 0 | 0 | 0 | 0 | 0 | 0 | 0 | 0 | 0 | 0 | 0 | 0 | 0 | 0 | 0/5 | |
| IV | $10^{-2}$ | 0 | 0 | 0 | 1 | 4 | 0 | 0 | 0 | 0 | 0 | 0 | 0 | 0 | 0 | 5/5 | >6.1 |
| | $10^{-3}$ | 0 | 0 | 0 | 1 | 1 | 3 | 0 | 0 | 0 | 0 | 0 | 0 | 0 | 0 | 5/5 | |
| | $10^{-4}$ | 0 | 0 | 0 | 1 | 0 | 4 | 0 | 0 | 0 | 0 | 0 | 0 | 0 | 0 | 5/5 | |
| | $10^{-5}$ | 0 | 0 | 0 | 0 | 0 | 3 | 2 | 0 | 0 | 0 | 0 | 0 | 0 | 0 | 5/5 | |
| | $10^{-6}$ | 0 | 0 | 0 | 0 | 0 | 0 | 0 | 3 | 0 | 0 | 0 | 0 | 0 | 0 | 3/5 | |
| Control | $10^{-3}$ | 0 | 0 | 0 | 1 | 1 | 3 | 0 | 0 | 0 | 0 | 0 | 0 | 0 | 0 | 5/5 | 5.3 |
| | $10^{-4}$ | 0 | 0 | 0 | 0 | 1 | 1 | 2 | 0 | 0 | 0 | 0 | 0 | 0 | 0 | 5/5 | |
| | $10^{-5}$ | 0 | 0 | 0 | 0 | 0 | 1 | 0 | 0 | 1 | 0 | 0 | 0 | 0 | 0 | 2/5 | |
| | $10^{-6}$ | 0 | 0 | 0 | 0 | 0 | 0 | 0 | 0 | 1 | 0 | 0 | 0 | 0 | 0 | 1/5 | |
| | $10^{-7}$ | 0 | 0 | 0 | 0 | 0 | 0 | 0 | 0 | 1 | 0 | 0 | 0 | 0 | 0 | 1/5 | |

EXAMPLE 5

On the protective antigen of glucuronic acid inactivated rabies virus:

(1) Prophylactic experiments for mice against rabies virus infection by sodium glucuronate and other chemically inactivated rabies virus.

*Testing method.*—0.1, 0.2 and 0.3 ml. of each of the above subcutaneously treated viruses were injected into mouse three times at intervals of 48 hours. In one week after the final immunization, 0.3 ml. of the active rabies virus (CVS strain, LD$_{50}$=10$^{-2.8}$/0.3 ml. subcutaneously) was challenged subcutaneously. Results as follows:

In the table I, II, III and IV designate respectively the same as are given in Example 5 (1).

As described above, the virus inactivated by the present invention does not thereby lose its antigenic property. The other viruses have the same tendency.

What we claim is:

1. A method for inactivating suspensions of live viruses comprising treating the virus suspension at a temperature of less than 23° C. with a compound selected from the group consisting of glucuronolactone, glucuronic acid and alkali metal glucuronate and maintaining the pH at between 5–8.

2. A method for inactivating suspensions of live viruses selected from the group consisting of mouse hepatitis, Japanese B encephalitis, rabies and influenza comprising treating the virus suspension at a temperature of less than 23° C. with a compound selected from the group consisting of glucuronolactone, glucuronic acid and alkali metal glucuronate and maintaining the pH at between 5–8.

| Antigens | Days in observation | | | | | | | | | | | | | | Mortality | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | Ratio | Percent |
| | Number of deaths by infection | | | | | | | | | | | | | | | |
| I | 0 | 0 | 0 | 0 | 0 | 0 | 0 | 3 | 0 | 1 | 0 | 0 | 0 | 0 | 4/20 | 20 |
| II | 0 | 0 | 0 | 0 | 0 | 0 | 0 | 4 | 2 | 0 | 0 | 0 | 0 | 0 | 6/20 | 30 |
| III | 0 | 0 | 0 | 1 | 0 | 0 | 0 | 0 | 0 | 1 | 0 | 0 | 0 | 0 | 2/20 | 10 |
| IV | 0 | 0 | 0 | 0 | 0 | 1 | 0 | 9 | 3 | 2 | 0 | 0 | 0 | 0 | 15/20 | 75 |
| Control | 0 | 0 | 0 | 0 | 0 | 0 | 0 | 16 | 2 | 1 | 0 | 0 | 0 | 0 | 19/20 | 95 |

NOTE.—Antigen I: Sodium glucuronate inactivated virus. II: Formalinized virus. III: M/800 N-benzyl-(bis-β-chloroethyl)-amine-N-oxide hydrochloride inactivated virus. IV: Heat-inactivated virus.

(2) Comparison of neutralizing antibodies production of inactivated rabies by various methods.

*Testing method.*—As in Example 5 (2) the mouse was inoculated with the above treated virus. 7 days after the final immunization, the mice were sucrified and the sera were obtained respectively. Titer of neutralizing anti- References Cited in the file of this patent "Glucuronolactone (1952)," Corn Products Sales Co. Chem. Div., 17 Battery Pl., N.Y. 4, N.Y., 20 pp.